(12) United States Patent
Shirahashi

(10) Patent No.: US 11,021,062 B2
(45) Date of Patent: Jun. 1, 2021

(54) VEHICLE POWER SUPPLY DEVICE

(71) Applicant: Panasonic Intellectual Property Management Co., Ltd., Osaka (JP)

(72) Inventor: Hideaki Shirahashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 16/459,642

(22) Filed: Jul. 2, 2019

(65) Prior Publication Data

US 2019/0322177 A1 Oct. 24, 2019

Related U.S. Application Data

(63) Continuation of application No. PCT/JP2017/037308, filed on Oct. 16, 2017.

(30) Foreign Application Priority Data

Mar. 9, 2017 (JP) .............................. JP2017-044705

(51) Int. Cl.
*B60L 3/00* (2019.01)
*B60L 58/10* (2019.01)
(Continued)

(52) U.S. Cl.
CPC ........ *B60L 3/00* (2013.01); *B60L 1/00* (2013.01); *B60L 3/0046* (2013.01);
(Continued)

(58) Field of Classification Search
CPC ..... Y02T 10/70; Y02T 10/7072; Y02T 10/72; Y02T 90/14; Y02T 10/62; B60R 16/03; H02J 2310/48; H02J 2207/10; B60L 58/20; B60L 2210/10; B60L 1/00; B60L 58/12; B60L 2210/12; B60L 3/0046; B60L 3/0084; B60L 53/22
See application file for complete search history.

(56) References Cited

U.S. PATENT DOCUMENTS

| 2010/0109437 A1* | 5/2010 | Fattic ...................... B60K 6/48 307/47 |
| 2012/0262106 A1* | 10/2012 | Omiya ................... B60R 16/03 320/104 |
| 2018/0126866 A1* | 5/2018 | Nozawa ................ B60L 3/0084 |

FOREIGN PATENT DOCUMENTS

JP 2006-254565 9/2006

OTHER PUBLICATIONS

International Search Report of PCT application No. PCT/JP2017/037308 dated Jan. 9, 2018.

* cited by examiner

*Primary Examiner* — Ryan Johnson
(74) *Attorney, Agent, or Firm* — Seed IP Law Group LLP

(57) ABSTRACT

A vehicle power supply device includes a first DC/DC converter, a DC/DC controller, a second DC/DC converter, and a vehicle controller. The first DC/DC converter converts a voltage output from a power source, and outputs the converted voltage to a first load. The DC/DC controller controls an operation of the first DC/DC converter. The second DC/DC converter operates by electric power supplied from the power source, and converts the voltage output from the power source and outputs the converted voltage to the DC/DC controller. The vehicle controller controls the DC/DC controller and the first load by supply of the voltage output from the first DC/DC converter and the voltage output from the second DC/DC converter.

5 Claims, 3 Drawing Sheets

(51) Int. Cl.
*B60L 1/00* (2006.01)
*B60R 16/03* (2006.01)
*B60L 58/20* (2019.01)

(52) U.S. Cl.
CPC ............. *B60L 3/0084* (2013.01); *B60L 58/10* (2019.02); *B60L 58/20* (2019.02); *B60R 16/03* (2013.01); *B60L 2210/10* (2013.01); *B60L 2240/547* (2013.01); *H02J 2207/20* (2020.01); *H02J 2310/48* (2020.01); *Y02T 10/70* (2013.01); *Y02T 10/72* (2013.01); *Y02T 90/14* (2013.01)

VEHICLE POWER SUPPLY DEVICE

CROSS-REFERENCE TO RELATED APPLICATIONS

This application is a continuation of the PCT International Application No. PCT/JP2017/037308 filed on Oct. 16, 2017, which claims the benefit of foreign priority of Japanese patent application No. 2017-044705 filed on Mar. 9, 2017, the contents all of which are incorporated herein by reference.

BACKGROUND

1. Technical Field

The present disclosure relates to a vehicle power supply device configured to supply electric power to a vehicle.

2. Description of the Related Art

As a conventional vehicle power supply device to be installed in a vehicle such as an electric car, there has been known a power supply device that is connected not only to a main battery (power source) configured to supply electric power for driving the vehicle, but also to an auxiliary battery configured to control electric power of the main battery. The auxiliary battery supplies electric power to a controller configured to control a DC/DC converter for converting a voltage of the main battery.

However, when the amount of electricity stored in the auxiliary battery decreases, the auxiliary battery cannot supply electric power to the controller, and, as a result, the DC/DC converter cannot operate. When the DC/DC converter cannot operate, the load of, for example, a vehicle system to which electric power is supplied by the DC/DC converter cannot be driven.

Therefore, Japanese Patent Unexamined Publication No. 2006-254565 discloses a configuration to supply electric power to the controller by a voltage applied from the main battery. This makes it possible to control a DC/DC converter without using an auxiliary battery, and thus makes it possible to drive a load by supply of electric power output from the DC/DC converter.

SUMMARY

The vehicle power supply device according to the present disclosure includes a first DC/DC converter, a DC/DC controller, a second DC/DC converter, and a vehicle controller. The first DC/DC converter converts a voltage output from a power source, and outputs the converted voltage to a first load. The DC/DC controller controls an operation of the first DC/DC converter. The second DC/DC converter operates by electric power supplied from the power source, and converts the voltage output from the power source and outputs the converted voltage to the DC/DC controller. The vehicle controller controls the DC/DC controller and the first load by supply of the voltage output from the first DC/DC converter and the voltage output from the second DC/DC converter.

According to the present disclosure, the reliability of the vehicle power supply device can be enhanced without using an auxiliary battery.

DETAILED DESCRIPTION OF PREFERRED EMBODIMENTS

According to the configuration described in Japanese Patent Unexamined Publication No. 2006-254565, when the DC/DC converter breaks down, a load cannot be driven, and hence, there are certain limits to an improvement in the reliability of a vehicle power supply device.

An object of the present disclosure is to provide a vehicle power supply device capable of increasing the reliability of the vehicle power supply device without using an auxiliary battery.

Figure 1:
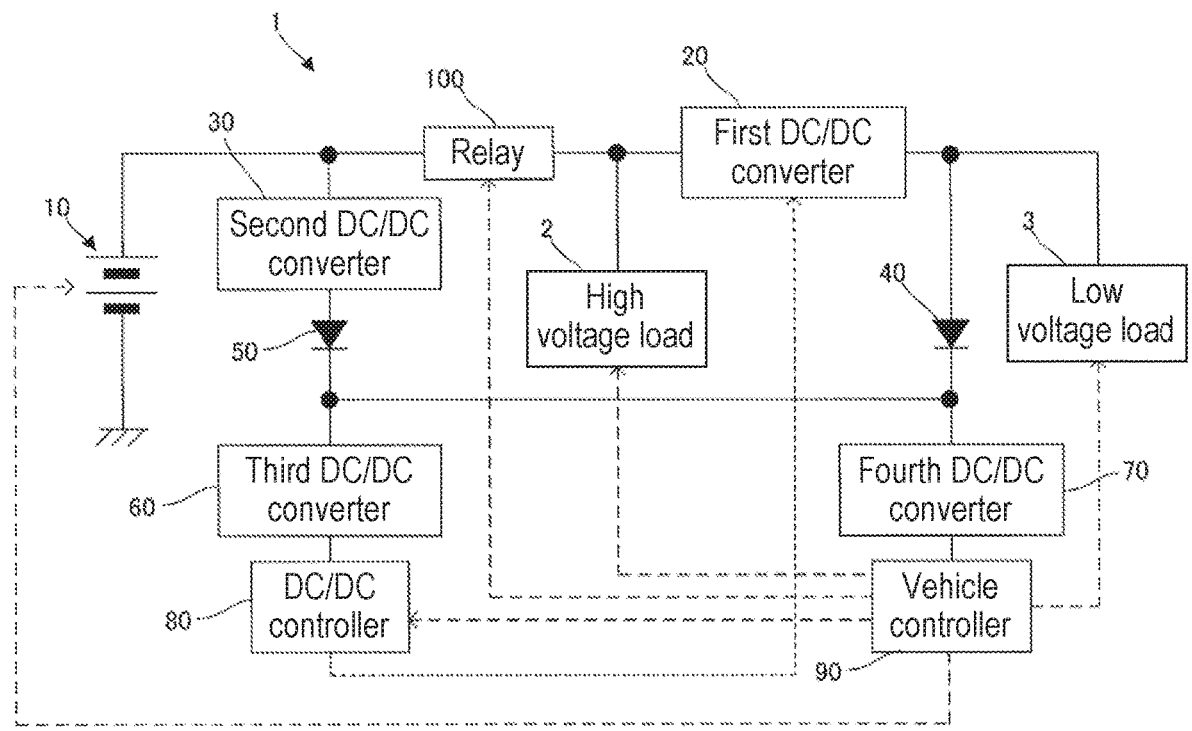
FIG. 1 is a diagram illustrating an example of a vehicle power supply device according to an embodiment of the present disclosure.

Hereinafter, the present embodiment will be described with reference to the drawings. FIG. 1 is a diagram illustrating an example of vehicle power supply device 1 according to the present embodiment.

Vehicle power supply device 1 is a power supply device to be installed in a vehicle such as an electric car. Vehicle power supply device 1 includes power source 10, first DC/DC converter 20, second DC/DC converter 30, first diode 40, second diode 50, third DC/DC converter 60, fourth DC/DC converter 70, DC/DC controller 80, vehicle controller 90, and relay 100.

Power source 10 includes a storage battery such as a lithium ion secondary battery, configured to output a first voltage (for example, 48 V). Power source 10 supplies electric power to high voltage load 2, first DC/DC converter 20, and second DC/DC converter 30. High voltage load 2 includes an inverter and a motor for driving a vehicle, and corresponds to a "second load".

First DC/DC converter 20 is a device configured to convert the first voltage applied from power source 10 into a second voltage (for example, 12 V) different from the first voltage, and supply electric power to low voltage load 3. Low voltage load 3 corresponds to a "first load".

First DC/DC converter 20 includes a switching regulator. First DC/DC converter 20 enters an operable state by supply of electric power from power source 10, and operates under the switching control of DC/DC controller 80.

First DC/DC converter 20 is not only connected to low voltage load 3, but also connected to DC/DC controller 80 via first diode 40 and third DC/DC converter 60, and connected to vehicle controller 90 via first diode 40 and fourth DC/DC converter 70. First diode 40 corresponds to a "diode".

First diode 40 is connected in parallel to low voltage load 3 with respect to first DC/DC converter 20. An anode of first diode 40 is connected to the output side of first DC/DC converter 20. A cathode of first diode 40 is connected to a branch point into third DC/DC converter 60 and fourth DC/DC converter 70. Such connection prevents an electric current from flowing backward from the cathode side of first diode 40 to the anode side of first diode 40. In other words, such connection allows output power of first DC/DC converter 20 to be supplied to third DC/DC converter 60 and fourth DC/DC converter 70, and, at the same time, prevents output power of second DC/DC converter 30 from being supplied to the output side (low voltage load 3) of first DC/DC converter 20.

Second DC/DC converter 30 is a device configured to convert the first voltage applied from power source 10 into the second voltage (for example, 12 V) different from the first voltage, and operate by supply of electric power from power source 10.

Second DC/DC converter 30 includes a linear regulator. Second DC/DC converter 30 is connected to DC/DC controller 80 via second diode 50 and third DC/DC converter 60, and connected to vehicle controller 90 via second diode 50 and fourth DC/DC converter 70.

An anode of second diode 50 is connected to the output side of second DC/DC converter 30. A cathode of second diode 50 is connected to a branch point into third DC/DC converter 60 and fourth DC/DC converter 70. Such connection prevents an electric current from flowing backward from the cathode side of second diode 50 to the anode side of second diode 50. In other words, such connection allows the output power of second DC/DC converter 30 to be supplied to third DC/DC converter 60 and fourth DC/DC converter 70, and, at the same time, prevents the output power of first DC/DC converter 20 from being supplied to second DC/DC converter 30.

Third DC/DC converter 60 and fourth DC/DC converter 70 are devices configured to convert voltages output from first DC/DC converter 20 and second DC/DC converter 30 into a third voltage (for example, 5 V).

Each of third DC/DC converter 60 and fourth DC/DC converter 70 includes a linear regulator. Third DC/DC converter 60 is connected to DC/DC controller 80, and supplies electric power to DC/DC controller 80 by applying the third voltage to DC/DC controller 80.

Fourth DC/DC converter 70 is connected to vehicle controller 90, and supplies electric power to vehicle controller 90 by applying the third voltage to vehicle controller 90.

Such connection allows DC/DC controller 80 and vehicle controller 90 to be supplied with electric power from both first DC/DC converter 20 and second DC/DC converter 30, via third DC/DC converter 60 and fourth DC/DC converter 70, respectively.

DC/DC controller 80 is supplied with electric power from third DC/DC converter 60, and controls first DC/DC converter 20 under the control of vehicle controller 90. Specifically, DC/DC controller 80 outputs, to first DC/DC converter 20, an activating signal to activate first DC/DC converter 20.

Vehicle controller 90 operates by supply of electric power from fourth DC/DC converter 70, and controls DC/DC controller 80, relay 100, high voltage load 2, and low voltage load 3.

Furthermore, vehicle controller 90 monitors whether or not the output voltage of first DC/DC converter 20 is normal. The normal output voltage of first DC/DC converter 20 means the output voltage of first DC/DC converter 20 in a state in which first DC/DC converter 20 can supply electric power capable of driving low voltage load 3. Note that the output voltage of first DC/DC converter 20 can be detected, for example, by monitoring an output unit of first DC/DC converter 20.

When the output voltage of first DC/DC converter 20 is not normal, vehicle controller 90 outputs the abnormality to an informing unit not illustrated. Thus, a user can easily know that first DC/DC converter 20 does not operate normally.

Furthermore, vehicle controller 90 monitors the state of the voltage of power source 10. When the voltage of power source 10 is not high enough, vehicle controller 90 outputs the lowness to the informing unit not illustrated. Thus, the user can easily know that the voltage of power source 10 is not high enough.

Relay 100 is connected in series to first DC/DC converter 20 with respect to power source 10, while relay 100 is connected in parallel with second DC/DC converter 30 with respect to power source 10. Under the control of vehicle controller 90, relay 100 switches power source 10 and first DC/DC converter 20 to either a conductive state or a non-conductive state. In other words, relay 100 selectively connect and disconnect power source 10 and first DC/DC converter 20.

When relay 100 is put into a conductive state, electric power is supplied to first DC/DC converter 20 from power source 10, whereby first DC/DC converter 20 can supply electric power to low voltage load 3, vehicle controller 90, and DC/DC controller 80. Note that, since first DC/DC converter 20 operates under the control of DC/DC controller 80, first DC/DC converter 20 does not operate as long as electric power is not supplied to DC/DC controller 80.

However, in the present embodiment, second DC/DC converter 30 is connected in parallel to relay 100 and first DC/DC converter 20 with respect to power source 10 (upstream from relay 100), and thus, second DC/DC converter 30 operates by supply of electric power from power source 10, regardless of the conductive or non-conductive state of relay 100.

Thus, in vehicle power supply device 1, electric power is supplied to DC/DC controller 80 and vehicle controller 90 by second DC/DC converter 30 at the time of an operation start. In other words, at the time of an operation start, electric power can be supplied to DC/DC controller 80 and vehicle controller 90 by second DC/DC converter 30 which is not connected to any load.

Thus, the efficiency of supplying electric power to DC/DC controller 80 and vehicle controller 90 can be enhanced, and furthermore, it is not necessary to provide, for example, an auxiliary battery for supplying electric power to DC/DC controller 80 and vehicle controller 90.

When the electric power is supplied to DC/DC controller 80 and vehicle controller 90 by second DC/DC converter 30, vehicle controller 90 and DC/DC controller 80 put first DC/DC converter 20 into an operable state.

In other words, output from both first DC/DC converter 20 and second DC/DC converter 30 allows DC/DC controller 80 and vehicle controller 90 to operate. Therefore, even when either first DC/DC converter 20 or second DC/DC converter 30 breaks down, vehicle controller 90 and DC/DC controller 80 can operate, and accordingly, the reliability of vehicle power supply device 1 can be enhanced.

When first DC/DC converter 20 is put into an operable state by operation of DC/DC controller 80 and vehicle controller 90, both first DC/DC converter 20 and second DC/DC converter 30 enter a state capable of applying an output voltage.

In the present embodiment, the output voltage (for example, 12.5 V) of first DC/DC converter 20 is desirably set to be higher than the output voltage (for example, 11.5 V) of second DC/DC converter 30. With this setting, the output of first DC/DC converter 20 including the switching regulator with higher conversion efficiency takes precedence over the output of second DC/DC converter 30 including the linear regulator.

With this precedence, after DC/DC controller 80 and vehicle controller 90 start to operate, electric power is supplied to DC/DC controller 80 and vehicle controller 90 by first DC/DC converter 20 with higher conversion efficiency. Thus, the efficiency of supplying electric power can be further enhanced.

High voltage load 2 is connected in parallel to first DC/DC converter 20 with respect to relay 100 (downstream from relay 100). Therefore, when electric power is supplied to DC/DC controller 80 and vehicle controller 90 by second DC/DC converter 30 at the time of an operation start, relay 100 is desirably put into a non-conductive state.

This substantially prevents electric power from being supplied to high voltage load 2 at the time of the operation start.

Figure 2:
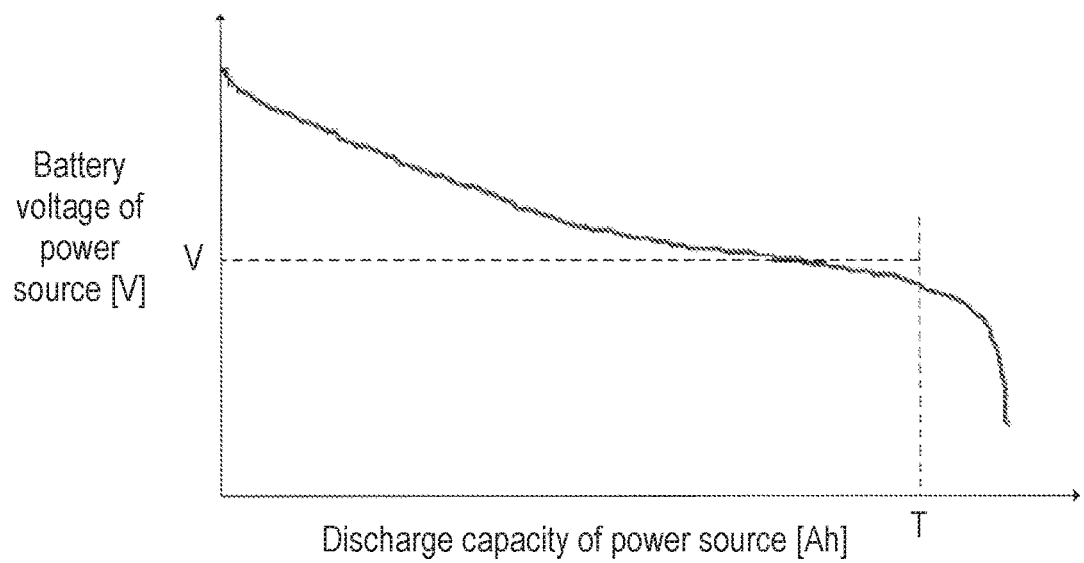
FIG. 2 is a graph illustrating a relationship between the discharge capacity of a power source and the battery voltage of the power source.

Note that, as described above, in vehicle power supply device 1, based on the electric power of power source 10, vehicle controller 90 operates without using an auxiliary battery. Here, power source 10 includes a storage battery, and accordingly, the voltage thereof decreases as the time passes after the operation start of vehicle power supply device 1. FIG. 2 is a graph illustrating a relationship between the discharge capacity of power source 10 and the battery voltage of power source 10. The horizontal axis in FIG. 2 represents the duration of time that power source 10 can continue discharge, and indicates that the duration of time that power source 10 can continue discharge decreases toward the right side of the horizontal axis.

As illustrated in FIG. 2, as the dischargeable capacity of power source 10 decreases, the voltage of power source 10 gradually decreases, and furthermore, when discharge continues to be performed even after the discharged capacity exceeds predetermined state T, the voltage of power source 10 rapidly decreases. When the voltage of power source 10 rapidly decreases, electric power supply to vehicle controller 90 stops, and vehicle controller 90 cannot appropriately operate. Accordingly, vehicle controller 90 cannot perform charge control.

Therefore, in the present embodiment, when the voltage of power source 10 becomes equal to or lower than predetermined voltage V, vehicle controller 90 puts relay 100 into the non-conductive state. Predetermined voltage V is a voltage value of power source 10 in a state before the discharged capacity of power source 10 is put into predetermined state T. Predetermined voltage V is set, for example, at a voltage value with which vehicle controller 90 can perform charge control.

With such setting, electric power is not supplied to high voltage load 2 and low voltage load 3 when the dischargeable capacity of power source 10 decreases. Compared with high voltage load 2 and low voltage load 3, the power consumption of vehicle controller 90 that operates with the third voltage is extremely low, and therefore, vehicle controller 90 can perform charge control before power source 10 completely stops. Note that, when a vehicle is running, an evacuation operation is performed before the voltage of power source 10 becomes equal to or lower than predetermined voltage V, and after performing the evacuation operation, relay 100 is put into the non-conductive state.

Figure 3:
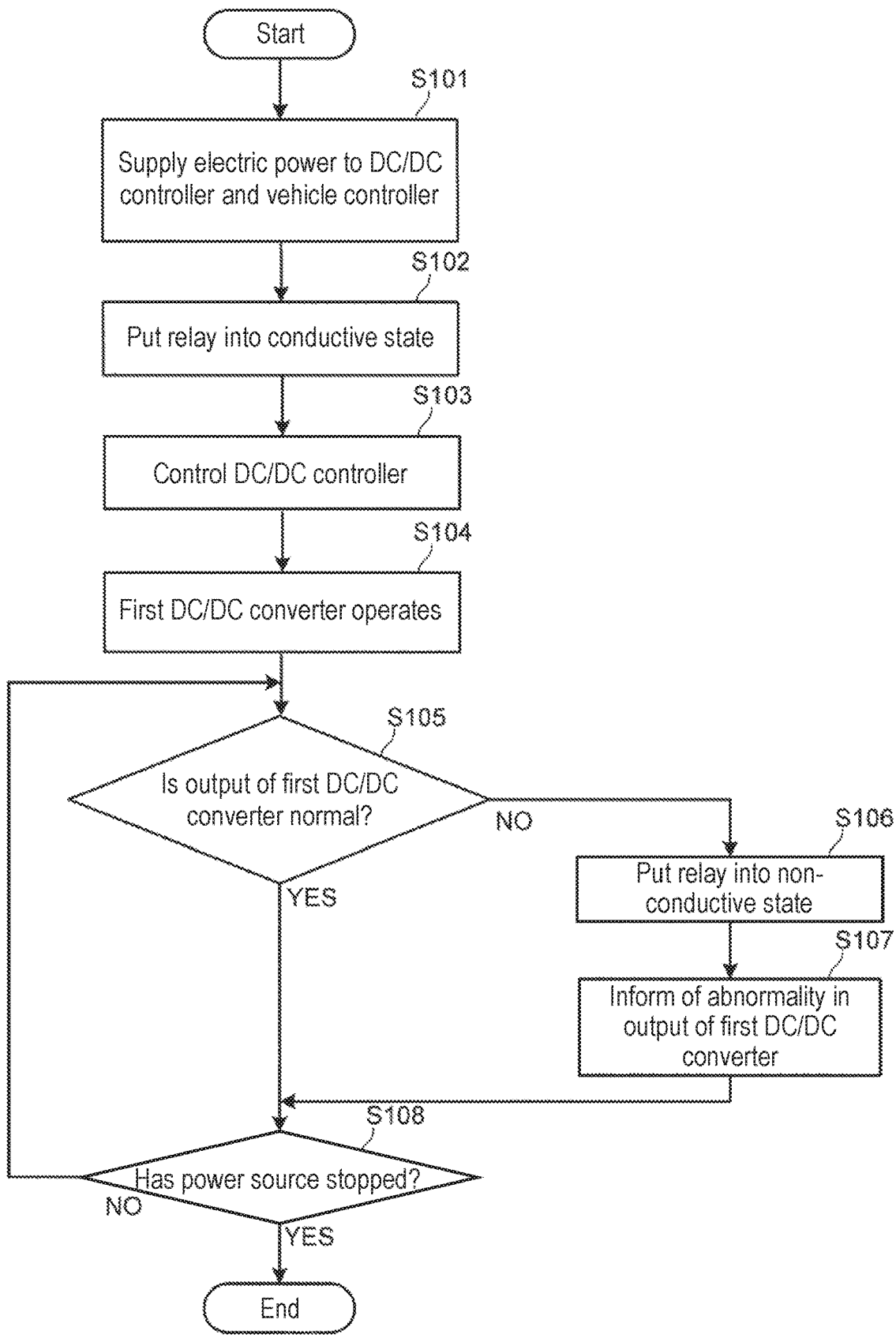
FIG. 3 is a flow chart illustrating an operation example of power source control in the vehicle power supply device illustrated in FIG. 1.

An operation example of power source control in vehicle power supply device 1 configured as described above will be described. FIG. 3 is a flow chart illustrating an operation example of power source control in vehicle power supply device 1. Processing in FIG. 3 is illustrated using a flow chart on the assumption that first DC/DC converter 20 breaks down.

As illustrated in FIG. 3, second DC/DC converter 30 operates by the electric power supplied from power source 10 of vehicle power supply device 1, and electric power is supplied to DC/DC controller 80 and vehicle controller 90 via third DC/DC converter 60 and fourth DC/DC converter 70 to put DC/DC controller 80 and vehicle controller 90 into an operable state (Step S101).

Next, vehicle controller 90 puts relay 100 into the conductive state (Step S102). Processing in Step S102 may be performed, for example, based on an operation instruction of a user, or may be performed automatically at the time when vehicle controller 90 is driven.

Next, vehicle controller 90 controls DC/DC controller 80 (Step S103). Then, DC/DC controller 80 controls first DC/DC converter 20 so that first DC/DC converter 20 starts to operate (Step S104). At this time, as described above, the output power of first DC/DC converter 20 is desirably preferentially supplied to DC/DC controller 80 and vehicle controller 90.

Next, vehicle controller 90 determines whether or not the output of first DC/DC converter 20 is normal (Step S105). In a case where the result of the determination is that the output of first DC/DC converter 20 is normal (YES in Step S105), the processing proceeds to Step S108. In contrast, in a case where the result of the determination is that the output of first DC/DC converter 20 is abnormal (NO in Step S105), vehicle controller 90 puts relay 100 into the non-conductive state (Step S106). Here, vehicle controller 90 is supplied with electric power from both first DC/DC converter 20 and second DC/DC converter 30, and therefore, even when first DC/DC converter 20 enters an abnormal state, vehicle controller 90 can operate by the output power of second DC/DC converter 30.

Next, vehicle controller 90 performs control for informing a user that relay 100 has been put into the non-conductive state, more specifically that the output of first DC/DC converter 20 is not normal (Step S107).

Next, vehicle controller 90 determines whether or not to have received an instruction for stopping power source 10 (Step S108). In a case where the result of the determination is that an instruction for stopping power source 10 has not been received (NO in Step S108), processing returns to Step S105. In contrast, in a case where the result of the determination is that an instruction for stopping power source 10 has been received (YES in Step S108), the present control is terminated.

Figure 4:
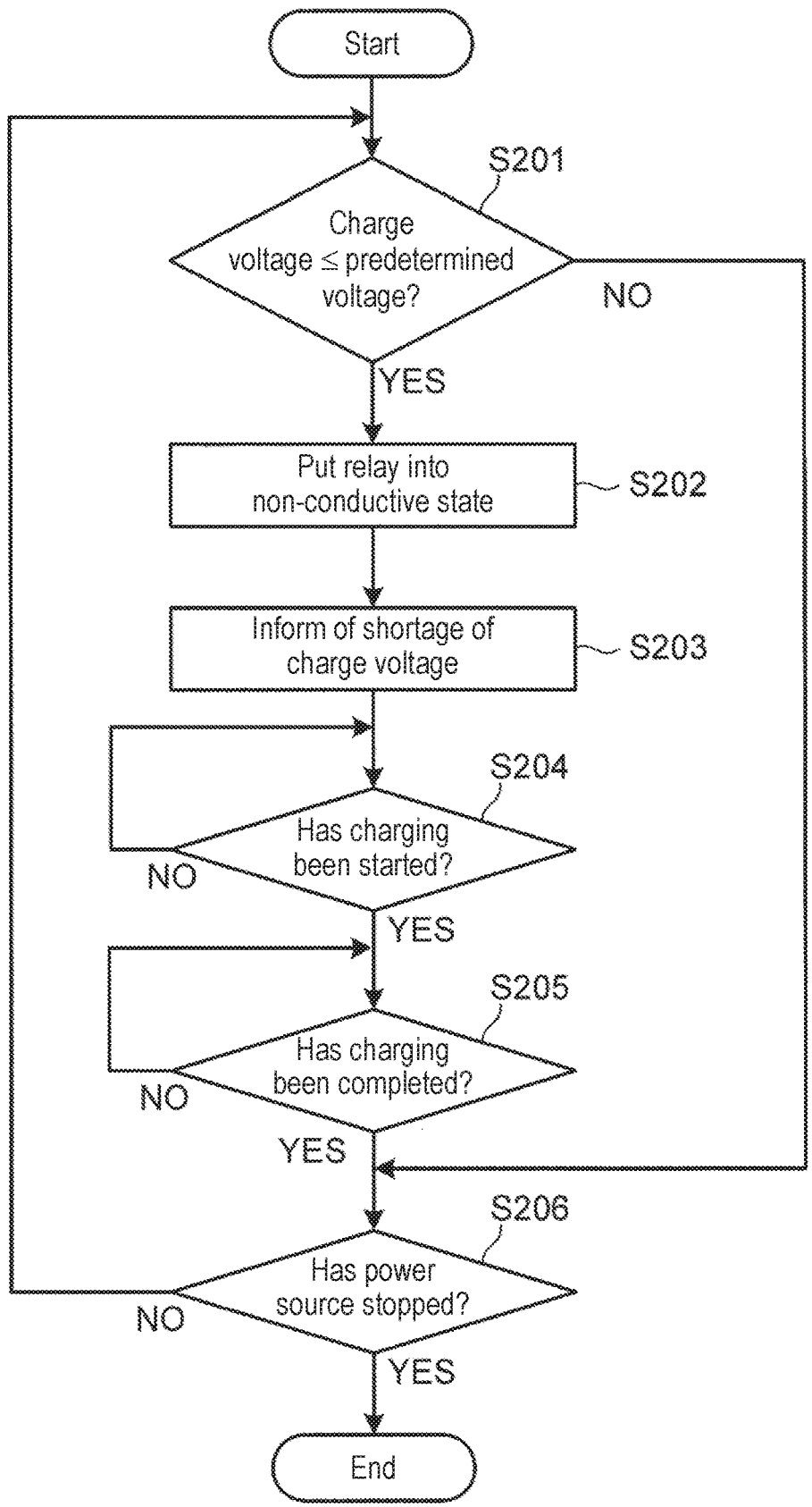
FIG. 4 is a flow chart illustrating an operation example of charge monitoring control of a power source in the vehicle power supply device illustrated in FIG. 1.

Next, an operation example of charge monitoring control of power source 10 in vehicle power supply device 1 will be described. FIG. 4 is a flow chart illustrating the operation example of the charge monitoring control of power source 10 in vehicle power supply device 1. Processing in FIG. 4 is appropriately executed at the time when power source 10 of vehicle power supply device 1 start to operate.

As illustrated in FIG. 4, vehicle controller 90 determines whether or not the voltage of power source 10 is equal to or lower than a predetermined voltage (Step S201). If the result of the determination is that the voltage of power source 10 is higher than the predetermined voltage (NO in Step S201), processing proceeds to Step S206.

In contrast, in a case where the result of the determination is that the voltage of power source 10 is equal to or lower than the predetermined voltage (YES in Step S201), vehicle controller 90 puts relay 100 into the non-conductive state (Step S202). Thus, electric power for operation of vehicle controller 90 is secured. Next, vehicle controller 90 informs that the voltage of power source 10 is not high enough (Step S203). Note that, in this case, the output power of second DC/DC converter 30 is supplied also to the informing unit (not illustrated).

Next, vehicle controller 90 determines whether or not a charge plug is connected to a vehicle and a start of charging of power source 10 has been requested (Step S204). In a case where the result of the determination is that a start of charging power source 10 has not been requested (NO in Step S204), processing in Step S204 is repeated. In contrast, in a case where a start of charging of power source 10 has been requested (YES in Step S204), vehicle controller 90 charges power source 10 under charge control based on the state of power source 10, for example. Note that, in this case, the output power of second DC/DC converter 30 is supplied also to constituents (such as a charger controller) necessary for the charge control. Subsequently, vehicle controller 90 determines whether the charging of power source 10 has been completed (Step S205).

In a case where the result of the determination is that the charging of power source 10 is not completed (NO in Step S205), processing in Step S205 is repeated. In contrast, in a case where the charging of power source 10 is completed (YES in Step S205), vehicle controller 90 determines whether or not to have received an instruction for stopping power source 10 (Step S206).

In a case where the result of the determination is that an instruction for stopping power source 10 has not been received (NO in Step S205), processing returns to Step S201. In contrast, in a case where the result of the determination is that an instruction for stopping power source 10 has been received (YES in Step S206), the present control is terminated.

According to the present embodiment configured as described above, electric power can be supplied to DC/DC controller 80 and vehicle controller 90 by at least one of first DC/DC converter 20 and second DC/DC converter 30. Thus, even when either first DC/DC converter 20 or second DC/DC converter 30 breaks down, DC/DC controller 80 and vehicle controller 90 can operate. Furthermore, using second DC/DC converter 30, electric power can be supplied to DC/DC controller 80 and vehicle controller 90 at the time of an operation start, and therefore, it is not necessary to provide an auxiliary battery. Hence, in the present embodiment, the reliability of vehicle power supply device 1 can be enhanced without using an auxiliary battery.

The provision of first diode 40 prevents an electric current from flowing backward from the cathode side of first diode 40 to the anode side thereof, that is, to first DC/DC converter 20 thereof. This can prevent the output voltage of second DC/DC converter 30 from having an adverse effect on the supply of electric power from first DC/DC converter 20 to low voltage load 3.

In a case where the output voltage of first DC/DC converter 20 is made higher than the output voltage of second DC/DC converter 30, during the operation of first DC/DC converter 20, the output voltage of the first DC/DC converter 20 takes precedence in the supply of electric power to DC/DC controller 80 and vehicle controller 90. Thus, during the operation of first DC/DC converter 20, the efficiency of supplying electric power can be enhanced.

Using second DC/DC converter 30, electric power can be supplied to DC/DC controller 80 and vehicle controller 90. Therefore, it is not necessary to provide an auxiliary battery for supplying electric power to DC/DC controller 80 and vehicle controller 90.

When the voltage of power source 10 becomes equal to or lower than a predetermined voltage, relay 100 is put into the non-conductive state. Thus, when the dischargeable capacity of power source 10 decreases, electric power is prevented from being supplied to high voltage load 2 and low voltage load 3, whereby electric power for charge control of power source 10 is secured. Compared with high voltage load 2 and low voltage load 3, vehicle controller 90 configured to operate by the third voltage has much lower power consumption, and thus, before power source 10 completely stops, vehicle controller 90 can perform charge control.

Note that, in the above-described embodiment, first diode 40 and second diode 50 are provided, but, the present disclosure is not limited to this, and first diode 40 and second diode 50 may not be provided.

In addition, any of the above-described embodiments is merely a specific example for realizing the present disclosure, and these embodiments should not be construed as limiting the scope of the present disclosure. That is, the present disclosure can be realized in various ways, without deviating from the sprit and main characteristics of the present disclosure.

The vehicle power supply device of the present disclosure has high reliability, and therefore, it is not necessary to use an auxiliary battery. Hence, the vehicle power supply device is useful as a power supply device for vehicles which require high reliability.

What is claimed is:

1. A vehicle power supply device, comprising:
   a first DC/DC converter configured to convert a voltage output from a power source and output the converted voltage to a first load;
   a DC/DC controller configured to control an operation of the first DC/DC converter;
   a second DC/DC converter configured to operate by electric power supplied from the power source, and convert the voltage output from the power source and output the converted voltage to the DC/DC controller; and
   a vehicle controller configured to control the DC/DC controller and the first load by supply of the voltage output from the first DC/DC converter and the voltage output from the second DC/DC converter,
   wherein the voltage output from the first DC/DC converter is higher than the voltage output from the second DC/DC converter.

2. The vehicle power supply device according to claim 1, further comprising a diode,
   the diode including:
   an anode connected to the first DC/DC converter; and
   a cathode connected to the vehicle controller.

3. The vehicle power supply device according to claim 1, further comprising
   a relay configured to selectively connect and disconnect the power source and the first DC/DC converter,
   wherein the second DC/DC converter is connected in parallel to the relay and the first DC/DC converter with respect to the power source.

4. The vehicle power supply device according to claim 3, wherein the vehicle controller is configured to put the relay into the non-conductive state upon detecting that a voltage of the power source becomes equal to or lower than a predetermined voltage.

5. The vehicle power supply device according to claim 3, wherein a second load is provided to be connected in parallel to the first DC/DC converter with respect to the relay.

* * * * *